Figure 1:
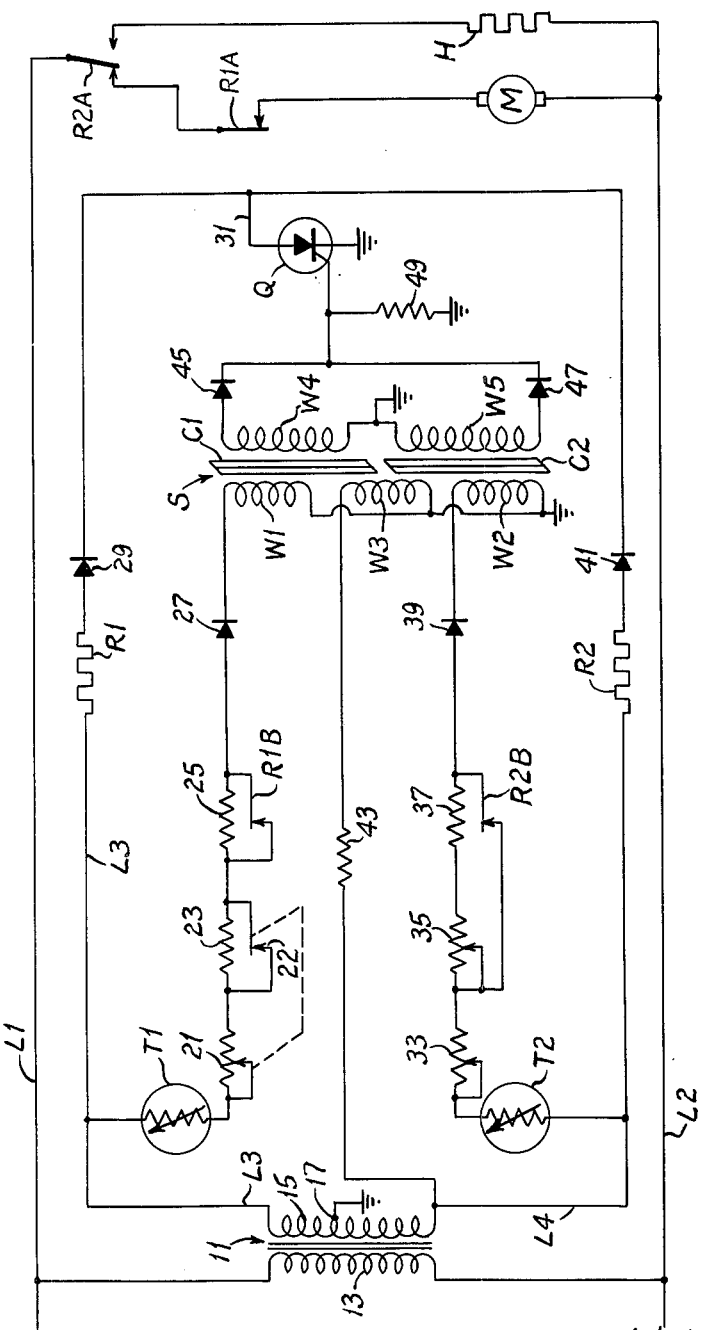

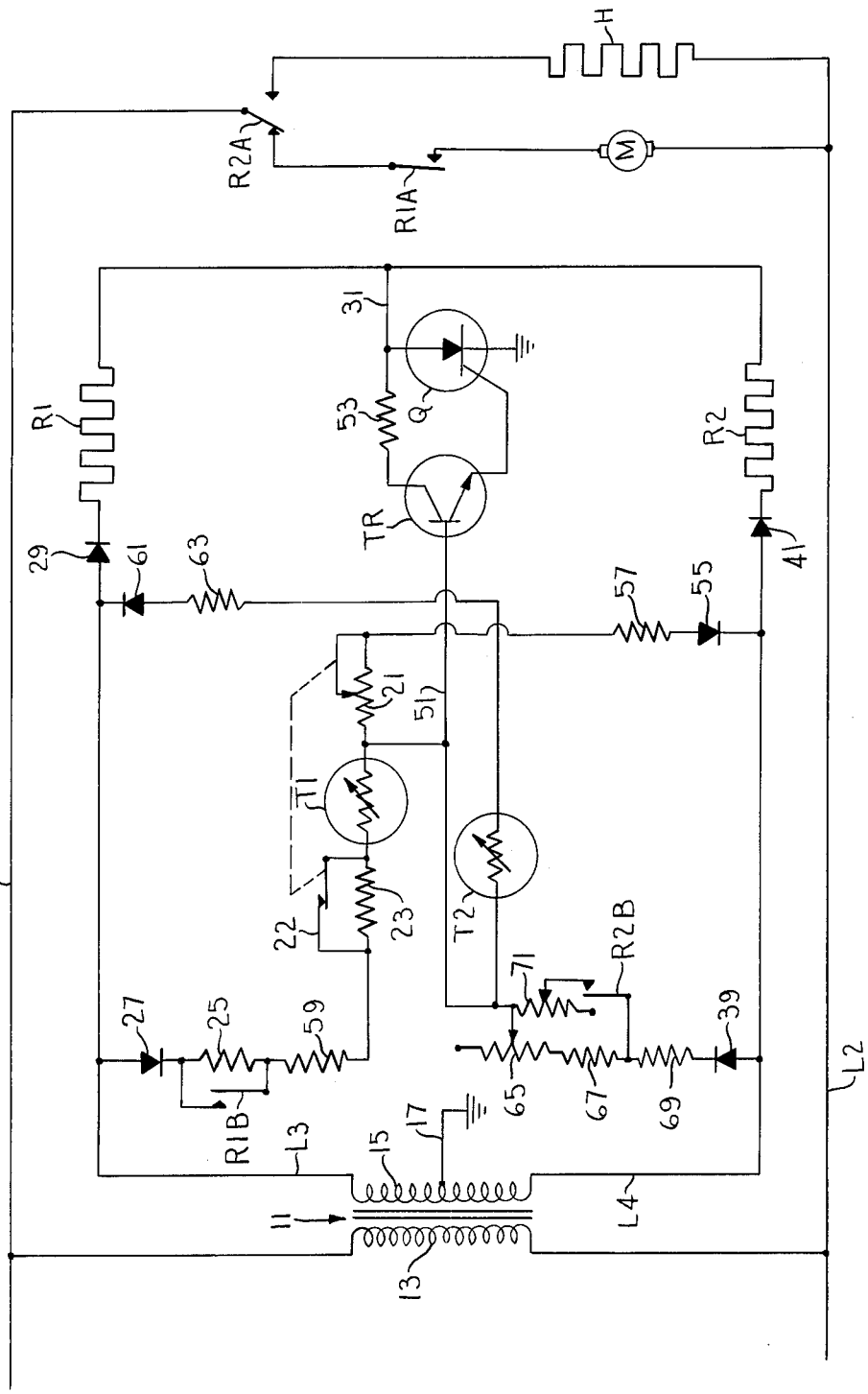

3,222,882
REFRIGERATION TEMPERATURE AND FROST CONTROL
Walter T. Sutton, Jr., and James D. Broyles, Lexington, Ky., assignors to Texas Instruments Incorporated, Dallas, Tex., a corporation of Delaware
Filed Jan. 17, 1964, Ser. No. 340,590
19 Claims. (Cl. 62—80)

This is a continuation-in-part of abandoned application Serial No. 260,416, filed February 25, 1963.

This invention relates to refrigeration control, and more particularly to methods and apparatus for controlling temperature and frost build-up in a refrigeration system.

Among the several objects of this invention may be noted the provision of an electronic system for controlling the operation of refrigeration apparatus to regulate both temperature and frost build-up; the provision of such a system wherein temperature sensors having reduced thermal mass are employed whereby the response time of the system is appreciably reduced; the provision of a control for automatically defrosting a refrigeration unit when the frost build-up therein reaches a predetermined level, and wherein the actual frost build-up rather than estimated frost build-up is employed as a criterion in determining the necessity of a defrost cycle; the provision of a control of the class described wherein a reduced number of components are provided to accomplish the necessary control functions; the provision of a control of the class described wherein electrical insulating problems are minimized; the provision of a method for controlling the operation of refrigeration apparatus to regulate both temperature and frost build-up; and the provision of a control for a refrigeration unit which is relatively inexpensive, rugged, and extremely reliable in operation. Other objects and features will be in part apparent and in part pointed out hereinafter.

In copending, coassigned application Serial No. 260,417, filed February 25, 1963, an electronic system is disclosed which controls the operation of the refrigeration unit. In general, this system includes two portions: a first portion for maintaining the temperature within a refrigerated zone at a predetermined level, and a second portion for automatically initiating a defrost cycle when the frost build-up within the unit exceeds a predetermined amount. For the most part, each of these portions employs separate electrical or electronic components. The present invention relates to a refrigeration unit control which provides generally the same control functions as the system of the above-mentioned application, but which does so with a reduced number of components. In this respect, then, the system of this invention constitutes an improved modification of the invention of the above copending application.

Essentially, this invention relates to a control for refrigeration apparatus having cooling means adapted when energized or actuated to absorb heat from a refrigerated zone and wherein a portion at least of the cooling means is subject to undesirable frost build-up. The control comprises first means associated with the cooling means which are adapted when actuated to cause the cooling means to be energized, and second means adapted when actuated to defrost the cooling means. The control further comprises a first temperature sensor, for example, a thermistor, positioned within the refrigerated zone to sense the temperature therein, and a second temperature sensor positioned contiguous the portion of the cooling means which is subject to frost build up. Finally control means are provided which are responsive to the first and second temperature sensors and which selectively actuate the first and second means. These control means include: (1) means for applying out-of-phase pulses respectively to the first and second means, (2) an electrical circuit which preferably includes a single electronic transducer, for example, a silicon controlled rectifier or other electronic control device, interconnected with the first and second means, and (3) means interconnected with the first and second temperature sensors for applying pulses to the electrical circuit to cause conduction thereof in phase with the pulses applied to the first means when the temperature of the first sensor has a predetermined relationship with respect to a first temperature level (for example when the temperature of this sensor is greater than this first temperature level), and for applying pulses to the electrical circuit to cause conduction thereof in phase with the pulses applied to the second means when the temperature of the second temperature sensor has a predetermined relationship with respect to a second temperature level (for example when the temperature of this second sensor is less than this second temperature level). The result is that the first means, i.e., the means which causes energization of the cooling means, is actuated when the temperature of the first sensor rises above the first temperature level and the second means, i.e., the defrost means, is actuated when the frost build-up on the portion of the cooling means increases to the point where the temperature of the second temperature sensor is depressed to a temperature below the second predetermined temperature level.

The invention accordingly comprises the constructions, circuits, and methods hereinafter described, the scope of the invention being indicated in the following claims.

Figure 2:
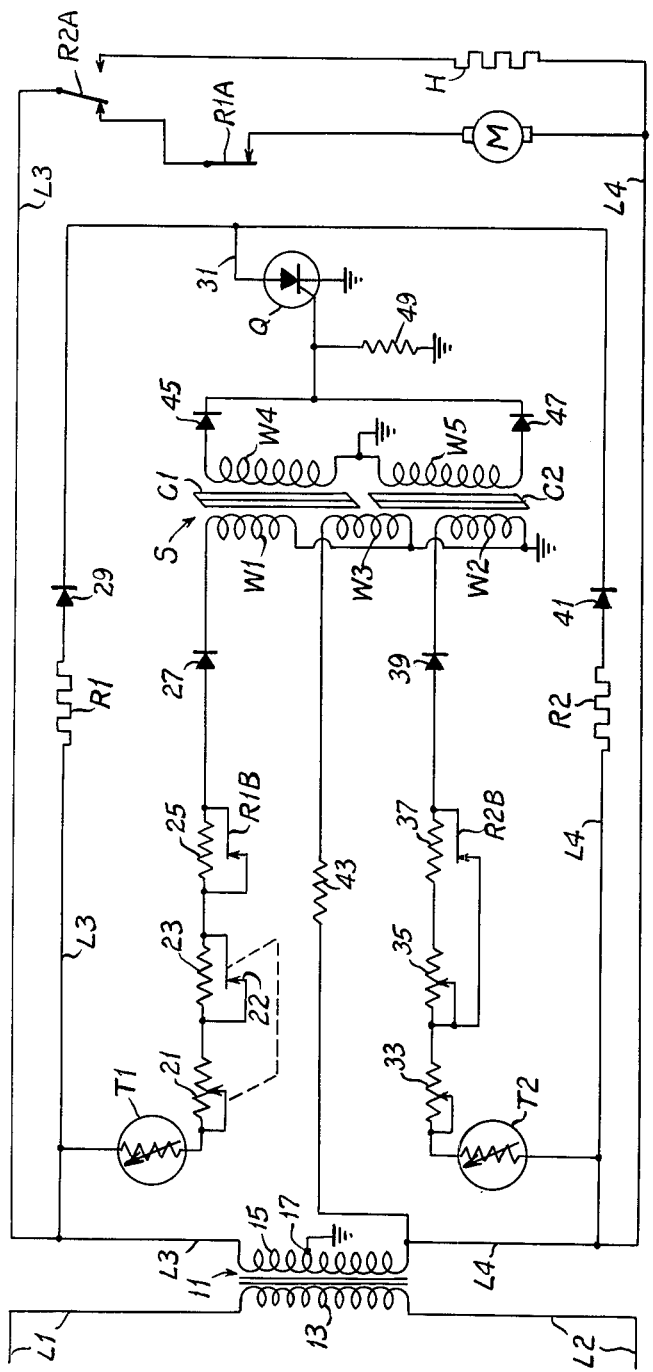

In the accompanying drawings, FIGS. 1, 2 and 3 are circuit diagrams illustrating the electrical components of three preferred embodiments of the present invention and their interconnection.

Corresponding reference characters indicate corresponding parts throughout the drawings.

Referring now to FIG. 1, a first embodiment of the present invention is illustrated as comprising a step-down transformer 11 having a primary winding 13 connected across a pair of conductors L1 and L2 which supply power from a 117 v. A.C. source. The secondary winding of transformer 11, indicated at 15, supplies out-of-phase A.C. power, preferably at 15 volts, to a pair of lines L3 and L4. The secondary winding has a center tap 17 which is connected to ground as indicated. Connected to line L3 is a thermistor T1. Preferably this thermistor has a negative temperature coefficient; i.e., as its temperature increases, its electrical resistance is reduced appreciably. Thermistor T1 is positioned within the zone to be cooled by the refrigerator unit under control to sense or respond to the temperature therein. Three resistances 21, 23 and 25 are connected in series with thermistor T1. Resistance 21 is a variable resistance having a movable arm or slider which controls the resistance thereof. This arm also actuates a set of contacts 22 shunt-connected across resistor 23. As explained hereinafter, the setting or adjustment of this movable arm determines or controls the temperature which is to be maintained within the refrigerated zone. While the present invention may be employed to control the operation of any refrigeration apparatus wherein temperature and frost control regulation is necessary, the invention will be disclosed as controlling temperature and frost build-up in a domestic refrigerator having a food compartment, a freezer compartment, and a refrigeration system having an evaporator, a condenser and a compressor unit. Thermistor T1, and preferably a properly calibrated control for the movable arm of resistance 21, are located within the food compartment of the refrigerator being controlled.

Resistance 25 is connected to the anode of a rectifying diode 27. The cathode of this diode is connected to a bias winding W1 of a saturable core device S described hereinafter. Also connected to line L3 is a heating element R1 of a thermal relay which has two sets of thermally-responsive, normally-closed contacts R1A and R1B positioned in heat exchange relationship with element R1. Contacts R1B are connected in parallel with resistor 25, while contacts R1A are connected in series with a motor M which drives the compressor of the refrigerator. Heating element R1 is connected to the anode of a rectifying diode 29, the cathode of which is connected by a conductor 31 to the anode of a silicon controlled rectifier Q. The cathode of rectifier Q is connected to ground as indicated.

The frost control portion of the FIG. 1 circuit includes a thermistor T2 connected to conductor L4. This thermistor is positioned contiguous a portion of the refrigerator's cooling means which is subject to frost build-up, preferably mechanically attached or bonded thereto. Typically, this cooling means will include the evaporator tube or coil located with the freezer compartment of the refrigerator. It is preferred that the thermistor T2 exhibit negative temperature coefficient characteristics. Connected in series with thermistor T2 are three resistors 33, 35 and 37. The latter is connected to the anode of a rectifying diode 39, the cathode of which is connected to a bias winding W2 of the saturable core device S. Also connected to line L4 is a heating element R2 of a second thermal relay. This second thermal relay includes a set of thermally-responsive contacts R2A which function as a single-pole, double-throw switch, and a set of normally-closed contacts R2B connected in shunt across resistances 35 and 37. One terminal of switch R2A is connected in series with contacts R1A and motor M; and another terminal of contacts R2A is connected to a defrost heater H which is positioned in heat exchange relationship with the portion of the cooling means which is subject to frost buildup. Normally (i.e., when element R2 is de-energized) the arm of switch R2A is in its left position to permit energization of motor M. Heating element R2 is connected in series with a rectifying diode 41 between lines L4 and conductor 31. A current limiting resistor 43 is connected between line L4 and an input winding W3 of saturable core device S.

Resistances 33 and 35 are variable resistances having movable arms or contacts; the adjustment or setting of resistance 33 determines or controls the defrost initiation point, while the setting or adjustment of resistance 35 controls the point at which the defrost cycle is terminated.

In addition to windings W1, W2, and W3, the saturable core assembly S includes two saturable cores C1 and C2 and two output windings W4 and W5. Each of the latter are commonly connected to ground as indicated. The ungrounded end of winding W4 is connected by means of a rectifying or steering diode 45 to the gate or control electrode of SCR Q. Similarly, the ungrounded terminal of winding W5 is connected by a rectifying steering diode 47 to this gate electrode. A biasing resistor 49 is provided, connected between this gate electrode and ground.

Assembly S functions generally as two independent saturable reactors or magnetic amplifiers. Its characteristics are such that when the current flowing through bias winding W1 is at a relatively low value, the A.C. potential applied across winding W3 is inductively coupled to output winding W4. Similarly, when the current through bias winding W2 is at a relatively low level, this A.C. potential is coupled from winding W3 to output winding W5. As the current through either of the windings W1 or W2 is increased to respectively increase the D.C. flux in cores C1 or C2, the amplitudes of the respective voltages induced in windings W4 and W5 are appreciably reduced. Because of the polarities of windings W4 and W5, the voltages developed across these windings are 180° out-of-phase with each other; the voltage developed across winding W4 being in-phase with the voltage between line L3 and ground, and the voltage developed across winding W5 being in-phase with the voltage between line L4 and ground.

Operation of the FIG. 1 embodiment is as follows: The food compartment temperature control portion of the FIG. 1 circuit will be considered first. The temperature which is to be maintained within the food compartment is selected by the adjustment or setting of the movable arm of resistance 21. When the temperature within this compartment is below this preselected temperature, the resistance of thermistor T1 is high enough so that the flux density in core C1 (due to the current through bias winding W1) is of a level which permits the coupling or inducing of an A.C. voltage in winding W4 of an amplitude sufficient to cause diode 45 to apply positive pulses to the gate electrode of SCR Q. These pulses occur during the positive half-cycles of the A.C. voltage developed across winding W4, and thereby condition SCR Q to conduct during the positive half-cycles of the A.C. voltage applied to heater element R1 by line L3. Conduction of SCR Q, which functions as a current switching means, permits pulsating D.C. to flow through element R1 and thereby causes energization and heating of this element. Stated somewhat differently, line L3 and diode 29 may be thought of as applying pulsating D.C. power to heating element R1 which is conducted through this element (to thereby energize it) only when SCR Q is conditioned to conduct by pulses applied to its gate electrode which are in-phase or synchronism with the pulses applied to element R1. When the temperature within the food compartment is below that preselected, pulses are applied (by winding W4 and diode 45) to the gate electrode of SCR Q in-phase with the pulses applied to element R1. As a result, heating element R1 of the thermal relay is energized, and contacts R1A and R1B are maintained in their respective open positions.

When the temperature within the food compartment rises, the resistance of thermistor T1 decreases, thereby increasing the current through control winding W1. As the temperature within the food compartment rises above the preselected level, the resistance of thermistor T1 is decreased to a point wherein the A.C. voltage coupled from winding W3 to winding W4 is of insufficient amplitude to cause conduction of diode 45, and the pulses applied to the gate electrode of SCR Q are therefore cut off. As a result, SCR Q is no longer conditioned to conduct in-phase with the pulses applied to heating element R1, and this element is deenergized. As element R1 cools down, thermally-responsive contacts R1A and R1B are actuated to their normally-closed positions. The closing of contacts R1A connects motor M across lines L1 and L2, thereby energizing this motor and initiating a cooling cycle. The closing of contacts R1B in effect removes resistance 25 from the series circuit which includes thermistor T1 and winding W1, thereby further increasing the current through winding W1. This latter action provides a proper temperature differential for the system by insuring that once a cooling cycle is initiated, the temperature within the food compartment must be lowered to a point somewhat below the preselected temperature before the cooling cycle is terminated.

Motor M remains energized and the cooling cycle continues until the temperature within the food compartment is lowered to a point at which the voltage induced in winding W4 is of sufficient amplitude to again cause SCR to be conditioned to conduct in-phase with the pulses applied to heating element R1. This causes this element to be reenergized and, in turn, causes contacts R1A and R1B to be actuated to their open positions. The opening of contacts R1A deenergizes motor M and thereby terminates the cooling cycle; the opening of contacts R1B in effect reinserts resistance 25 in series with winding W1. The temperature control portion is thus reset to sense the temperature within the refrigerated zone and initiate a subsequent cooling cycle when this temperature again rises above the preselected level.

The operation of the frost control portion of the system is as follows: As noted above, thermistor T2 is positioned immediately adjacent the cooling means within the freezer compartment of the refrigerator under control. As the frost builds up on the cooling means and cools the thermistor, its temperature is decreased. This causes an increase in the resistance of thermistor T2 which in turn decreases the current through control winding W2 to a point wherein the A.C. voltage coupled from input winding W3 to output winding W5 is sufficient to cause diode 47 to apply positive pulses to the gate electrode of SCR Q. These pulses occur during the positive half-cycles of the A.C. voltage developed across winding W5, and accordingly condition SCR Q to conduct during the positive half-cycles of the A.C. voltage applied to heater element R2 by line L4. This permits pulsating D.C. to flow through element R2 and cause energization thereof. Stated somewhat differently, line L4 and diode 41 may be thought of as applying D.C. pulses to heating element R2 which are conducted through this element (to thereby energize it) only when SCR Q is conditioned to conduct in-phase with the pulses applied to element R2. When the temperature of thermistor T2 is lowered by the frost build-up on the cooling means, pulses are applied to the gate electrode of SCR Q to condition it to conduct in-phase with the pulses applied to element R2, and as a result, this element is heated. This causes actuation of thermally-responsive switches R2A and R2B. The arm of switch R2A is actuated to the right (as viewed in FIG. 1) to prevent energization of compressor motor M and cause energization of defrost heater H, and contacts R2B open, thereby in effect inserting resistances 35 and 37 in series with the control winding W2. This latter action provides a proper temperature differential in the frost-control portion of the system by insuring that the temperature of thermistor T2 must be increased to a point above that at which a defrost cycle was initiated before this cycle is terminated. As noted above, the setting of variable resistance 35 controls the point at which a defrost cycle is terminated.

The energization of heater H defrosts the cooling means within the freezer compartment and concurrently raises the temperature of thermistor T2. This decreases the resistance of this thermistor and thereby increases the current through control winding W2. At some point, the current through this control winding is increased to a level wherein the A.C. voltage coupled to output winding W5 is of insufficient amplitude to cause diode 47 to trigger SCR Q in phase with the pulses applied to heating element R2. As a result, this heating element is deenergized, and contacts R2A and R2B are permitted to return to their normal positions. The actuation of switch R2A to its left position deenergizes defrost heater H and permits energization of compressor motor M. The closing of contacts of R2B in effect removes resistances 35 and 37 from the series circuit which includes control winding W3. The defrost portion of the system is thus reset to sense frost build-up in the freezer compartment and initiate a subsequent defrost cycle when this build-up exceeds a predetermined amount.

Because of the phase relationships of the various signals appearing in the FIG. 1 circuit, a single transducer, SCR Q, can be employed (1) to control the energization of the cooling means (by controlling the energization of element R1 which in turn controls motor M) and (2) to control the energization of the defrost means (by controlling the energization of element R2 which in turn controls the energization of defrost heater H). In effect there is a time sharing of SCR Q between the two portions of the system: during one half-cycle of the A.C. voltage applied across lines L1 and L2, SCR Q is either triggered or not triggered to control the energization of the cooling means; and during the other half-cycle of this A.C. voltage, the SCR is either triggered or not triggered to control the energization of the defrost means. Because of this, and since magnetic or saturable core assembly S is a single component, the number of elements which are required to provide the two control functions are reduced.

Since the system of FIG. 1 employs thermistors having low thermal mass, the response time of the system is appreciably reduced. Also, because variable resistances are employed (1) to select the temperature to be maintained within the food compartment, (2) to select the point at which a defrost cycle is initiated, and (3) to control the termination point of a defrost cycle; these controls may be conveniently interlocked by ganging or mechanically interlocking the movable arms of the three variable resistances employed. Moreover, all external circuit components such as the defrost heater and the compressor motor are provided with positive mechanical switching. In view of this, the system is likely to be more acceptable to various approval agencies such as Underwriter's Laboratories which might be reluctant under the present standards to approve a system wherein electronic switching devices such as silicon controlled rectifiers are employed to provide load switching. As the art develops, however, the present system has the advantage of being readily convertible to an all-electronic control system. Because the control portion of the system employs low voltage throughout, the problems encountered in switching or controlling high voltage (i.e., 117 volts) are eliminated. Also, the problems and expense of providing acceptable insulation are considerably reduced.

Another feature of the FIG. 1 system is that a defrost cycle is initiated only when the frost on the cooling means builds up above a predetermined level; and the actual frost build-up rather than estimated frost build-up is employed as a criterion in determining the necessity of a defrost cycle. This system possesses substantial advantages over systems wherein a timer is provided to periodically defrost a cooling means according to a predetermined program, say once or twice daily. Moreover, because the present system actually senses the frost build-up within a refrigeration unit both to initiate a defrost cycle and terminate it, the durations of the defrost cycle are likely to be considerably less than in timer-operated systems.

A second embodiment of the invention is illustrated in FIG. 2. The control portion of this circuit, i.e., the portion which controls the energization of the two thermal relays, is identical to the FIG. 1 embodiment, and like elements are indicated by corresponding reference numerals. In FIG. 2, instead of employing a 117-volt compressor motor and a 117-volt defrost heater, these units are low-voltage, preferably 30-volt or less, units. Accordingly, instead of connecting these components across lines L1 and L2, they are connected across lines L3 and L4 which supply A.C. power at approximately 30 volts.

The operation of the FIG. 2 embodiment is the same as that outlined above in connection with FIG. 1. When the temperature within the food compartment goes above the preselected temperature, thermal relay R1 is controlled to cause compressor motor M to be energized. When the frost on the cooling means builds up sufficiently to cool thermistor T2, e.g., by partially enveloping it, relay R2 prevents energization of the compressor motor M and energizes defrost heater H.

The FIG. 2 embodiment possesses all of the substantial advantages of the FIG. 1 embodiment. Additionally, because the compressor motor and defrost heater are both low-voltage components, insulation problems are greatly reduced.

The FIG. 3 embodiment possesses all of the substantial advantages of the FIG. 1 embodiment, but additionally effects a further desirable feature in that the saturable core reactor S is replaced by a simple inexpensive solid-state device, a transistor TR, which selectively gates the silicon controlled rectifier Q. Referring now more specifically to the FIG. 3 embodiment, it will be noted that there are two separate temperature-sensitive bridges each having an output connected commonly to the input electrode (or base electrode in the particular configuration illustrated) of transistor TR by a conductor 51. The output electrodes of TR, i.e., the emitter and collector, together with a resistor 53 are connected across the gate-anode circuit of rectifier Q.

The first temperature-sensitive bridge includes as two legs thereof the two portions of transformer secondary winding 15 on each side of intermediate tap 17. A third leg of this bridge includes a diode 55, a resistor 57 and the cabinet temperature control rheostat 21, while the fourth bridge leg is constituted by the cabinet or food compartment temperature-sensing thermistor T1, the switch-shunted resistor 23, a resistor 59, the relay contact-shunted temperature differential resistor 25, and diode 27. Similarly, the other bridge includes the same two transformer secondary winding sections as the first two legs, while the third bridge leg is constituted by a diode 61, a resistor 63 and the frost build-up sensing thermistor T2. The fourth leg of this bridge includes an adjustable resistance 65, two resistors 67 and 69, diode 39, and an adjustable resistor 71, together with contacts R2B shunt-connected across the movable contact of resistance 65 and resistor 67.

The operation of the control of this FIG. 3 embodiment, although basically the same as that of the FIGS. 1 and 2 controls described above, differs in certain aspects. For example, when the box or cabinet temperature is below the preselected temperature the resistance of T1 is sufficiently high that the potential at the output (conductor 51) of this bridge is sufficient to maintain transistor TR reverse-biased and not pulse or gate the rectifier Q. Thus in this embodiment the thermal relay heater R1 is not energized while the cabinet temperature is below the preselected control level. Relay contacts R1A and R1B remain in their normally open position as shown and the compressor or other cooling means is not energized. Upon the cabinet temperature increasing to a level above that preselected, the resistance of T1 decreases and the magnitude and polarity of the half-wave rectified A.C. present at the output of this first bridge becomes sufficiently positive with respect to the instantaneous polarity of L3 to apply forward bias to the base of transistor detector TR and cause it to conduct, thereby driving the gate of rectifier Q so that this rectifier conducts. As the output pulses of Q are in phase with the positive half cycles of power applied via diode 29 to relay heater R1, the latter will be energized and actuate relay contacts R1A and R1B into closed positions. This effects operation of the compressor motor M and increases the differential of the controlled temperature within the cabinet as resistor 25 being shunted by R1B further decreases the resistance of this leg of this bridge. As the cabinet temperature drops below the preselected temperature (plus the differential), the resistance of thermistor T1 rises until the forward bias is removed from TR's base and rectifier Q is no longer gated in this phase.

The functioning of the other bridge including the frost build-up sensing thermistor T2 is similar. As the build-up of frost decreases the temperature of T2, its resistance will increase to the point where a positive or forward bias is applied to the base electrode of transistor detector TR causing it to conduct. The temperature at which this occurs is determined by the positioning of potentiometer 65. Rectifier Q is gated to conduct in phase with the positive half cycles of voltage applied to relay heater element R2 via 41, which is thereby energized with positive D.C. pulses and heats to actuate the arm of relay switch contacts R2A to the right and energize the defrost heater H to initiate the defrost cycle. The compressor motor is disabled during this cycle because of this positioning of R2A. Simultaneously, the other set of switch contacts R2B is actuated to a closed position, lowering the resistance in this leg of the bridge which further unbalances the bridge to produce an increased forward bias at the base of transistor TR. As the resistance of potentiometer 71 is much less than the resistance of 65 and 67, potentiometer 71 becomes the dominant element when contacts R2B are closed, thereby insuring that rectifier Q will continue energizing heater element R2 until a relatively high temperature of T2 is attained before the bridge rebalances and transistor TR is again reverse-biased to cut off conduction of rectifier Q. This increase in the differential of the temperature controlling the defrosting and frost build-up insures that the frost accumulation will be substantially entirely melted before relay heater R2 is again deenergized.

Thus the refrigeration control of this FIG. 3 embodiment functions not only to maintain the cabinet temperature within the limits established by adjustment of the cabinet temperature control potentiometer 21 (and the temperature differential as established by resistor 25), but will automatically insure defrosting whenever the frost accumulation becomes great enough. Although the controlled rectifier Q, transistor TR and portions of the two bridges are common to both cabinet temperature and frost build-up sensing circuit sections, separation of the two functions is maintained by the circuitry described which includes the steering diodes 27, 29, 39, 41, 55 and 61, and the out-of-phase relationship of the potentials of L3 and L4. As the on-off switch contacts 22 shunted across resistor 23 are ganged or linked to the temperature control potentiometer 21, the shunting of this resistor 23 in the off position insures a bridge unbalance which prevents transistor TR from becoming forward biased and energizing the compressor motor M.

In each of the embodiments disclosed herein, both high-voltage power and low-voltage power are available and accordingly, in any particular application, either compressor motor M or heater H could be operated at low voltage while the other is operated at high voltage. This adds greatly to the flexibility of the system since in many domestic refrigerators it might be desirable to employ a high-voltage compressor and a low-voltage defrost heater.

While the controlled rectifiers employed in the systems of FIGS. 1–3 are disclosed as silicon controlled rectifiers, these transducers could be made of semiconductor material other than silicon so long as they exhibit proper operating characteristics. Also, while controlled rectifiers are specifically disclosed, other electronic control devices or transducers could be employed to control the energization of the two thermal relays. For example, a power transistor and an avalanche diode might be employed to provide this control function.

Moreover, since SCR Q functions as a rectifier, diodes 29 and 41 are not, strictly speaking, necessary components of the systems of FIGS. 1 and 2. It is preferred that these diodes be included, however, since these elements permit the use of an SCR having an appreciably reduced PIV (peak inverse voltage) rating.

In view of the above, it will be seen that the several objects of the invention are achieved and other advantageous results attained.

As various changes could be made in the above constructions, circuits and methods without departing from the scope of the invention, it is intended that all matter contained in the above description or shown in the accompanying drawings shall be interpreted as illustrative and not in a limiting sense.

What is claimed is:

1. A control for refrigeration apparatus having cooling means adapted when energized to absorb heat from a refrigerated zone, at least a portion of said cooling means being subject to frost build-up, and defrost means adapted when energized to remove frost from said cooling means, said control comprising:

first means adapted when actuated to cause said cooling means to be energized, second means adapted when actuated to cause said defrost means to be energized, a first temperature sensor adapted to be positioned within said zone and responsive to the temperature therein, a second temperature sensor adapted to be positioned contiguous the portion of said cooling means which is subject to frost build-up, and control means responsive to said first and second sensors for selectively actuating said first and second means, said control means including:

means for applying out-of-phase pulses respectively to said first and second means, an electrical circuit interconnected with said first and second means, the conduction of said circuit selectively controlling the energization of said first and second means, and means interconnected with said first and second temperature sensors for applying pulses to said electrical circuit to cause conduction thereof in phase with the pulses applied to said first means when the temperature of said first sensor has a predetermined relationship with respect to a first temperature level, and for applying pulses to said electrical circuit to cause conduction thereof in phase with the pulses applied to said second means when the temperature of said second sensor has a predetermined relationship with respect to a second temperature level, whereby said first means is actuated when the temperature of said first sensor rises above said first temperature level and said second means is actuated when the frost builds up on said cooling means to cool said second temperature sensor and depress the temperature thereof below said second temperature level.

2. A control as set forth in claim 1 wherein said electrical circuit includes an electronic transducer having a control electrode, and wherein said means interconnected with said first and second temperature sensors includes means for applying pulses to said control electrode to control the conduction of said transducer and thereby control the conduction of said electrical circuit.

3. A control as set forth in claim 2 wherein said electronic transducer is a controlled rectifier, and said control electrode is the gate electrode of said rectifier.

4. A control as set forth in claim 2 wherein said means for applying pulses to said control electrode includes a saturable core assembly having a pair of output windings, and a pair of diodes interconnected respectively between each of said output windings and said control electrode.

5. A control as set forth in claim 2 wherein said means for applying pulses to said control electrode includes a transistor having one electrode connected and responsive to the respective resistances of said sensors.

6. A control as set forth in claim 1 wherein said first temperature sensor includes a first thermistor adopted to be positioned within said refrigerated zone, and wherein said second temperature sensor includes a second thermistor adopted to be positioned contiguous said cooling means.

7. A control as set forth in claim 1 wherein said first means includes a first relay having contacts for interconnection with said cooling means and adapted when actuated to cause said cooling means to be energized, and wherein said second means includes a relay and a defrost heater, said second relay having contacts for interconnection with said cooling means and said defrost heater which are adapted when actuated to prevent energization of said cooling means and cause energization of said defrost heater.

8. A control as set forth in claim 7 wherein said means for applying out-of-phase pulses respectively to said first and second means includes means for applying out of phase A.C. power to said first and second relays, and first and second rectifying diodes interconnected respectively with said first and second relays for converting said A.C. power to pulsating D.C. power.

9. A control for a refrigerator having a food compartment, a freezer compartment, cooling means in heat exchange relationship with said compartments adapted when energized to absorb heat therefrom, said cooling means being subject to frost built-up, and defrost means positioned contiguous said cooling means adopted when energized to defrost said cooling means, said control comprising:

a first thermistor adopted to be located within said food compartment, said thermistor having a resistance which varies as a function of the temperature thereof, a second thermistor adapted to be positioned contiguous said cooling means to sense the frost build-up thereon, a first relay having contacts for interconnection with said cooling means adapted when actuated to cause said cooling means to be energized, a second relay having contacts for interconnection with said cooling means and said defrost means adapted when actuated to prevent energization of said cooling means and to energize said defrost means, and control means responsive to the respective resistances of said first and second thermistors for selectively energizing said first and second relays, said control means comprising:

means for applying out-of-phase pulsating D.C. power to said first and second relays, an electrical circuit commonly connected in series with said first and second relays, the conductivity of said circuit selectively controlling the energization of said first and second relays, and means interconnected with said first and second thermistors and responsive to the respective resistances thereof for applying pulsating D.C. to said electrical circuit to cause conduction thereof in phase with the pulsating D.C. applied to said first relay when the resistance of said first thermistor reaches a first predetermined level, and for applying pulsating D.C. to said electrical circuit to cause conduction thereof in phase with the pulsating D.C. applied to said second relay when the resistance of said second thermistor reaches a second predetermined level, whereby the contacts of said first relay are actuated to energize said cooling means when the temperature within said food compartment rises above a first preselected temperature level, and the contacts of said second relay are actuated to prevent energization of said cooling means and to energize said defrost means when the frost builds up on said cooling means to cool said second thermistor and depress the temperature thereof below a second preselected temperature level.

10. A control as set forth in claim 9 wherein said electrical circuit includes a controlled rectifier having anode, cathode and gate electrodes, the anode-cathode circuit of said rectifier being commonly connected in series with each of said relays, and wherein said means for applying pulsating D.C. to said electrical circuit includes means for applying pulsating D.C. to said gate electrode to control the conductivity of said anode-cathode circuit.

11. A control as set forth in claim 10 wherein said means for applying pulsating D.C. to said gate electrode includes a magnetic amplifier assembly having first and second input windings interconnected respectively with said first and second thermistors, and first and second output windings interconnected by a pair of rectifying diodes with said gate electrode, the current through said first and second input windings controlling respectively the voltages developed across said output windings, thereby controlling the conductivity of said anode-cathode circuit.

12. A control as set forth in claim 10 wherein said means for applying pulsating D.C. to said gate electrode includes a transistor having an input electrode interconnected commonly with said first and second thermistors and an output electrode connected to said gate electrode.

13. A control as set forth in claim 9, further including a first variable resistance interconnected with said first thermistor for controlling said first preselected temperature level, and a second variable resistance interconnected with said second variable resistance for controlling said second preselected temperature level.

14. A control as set forth in claim 9 wherein said means for applying out-of-phase pulsating D.C. to said first and second relays includes a transformer for applying out-of-phase A.C. power to said first and second relays, and first and second rectifying diodes interconnected respectively with said first and second relays for converting said A.C. power to pulsating D.C. power.

15. A control as set forth in claim 9 wherein said first and second relays are thermal relays.

16. A control as set for in claim 9 further including means interconnected with said first thermistor for providing a differential in the response of said first relay to changes in the resistance of said first thermistor, and means interconnected with said second thermistor for providing a differential in the response of said second relay to changes in the resistance of said second thermistor.

17. A control for a refrigerator having a food compartment, a freezer compartment, and cooling means in heat exchange relationship with said compartments adapted when energized to absorb heat therefrom, said cooling means being subject to frost build-up, and defrost means positioned contiguous said cooling means adapted when energized to defrost said cooling means, said control comprising:
  a first thermistor adapted to be located within said food compartment, said thermistor having a resistance which varies as a function of the temperature thereof,
  a second thermistor adapted to be positioned contiguous said cooling means to sense the frost build-up thereon,
  a first relay having contacts for interconnection with said cooling means adapted when actuated to cause said cooling means to be energized,
  a second relay having contacts for interconnection with said cooling means and said defrost means adapted when actuated to prevent energization of said cooling means and to energize said defrost means,
  and control means responsive to the respective resistances of said first and second thermistors for selectively energizing said first and second relays, said control means comprising:
    a transformer winding for applying out-of-phase pulsating D.C. power to said first and second relays,
    an electrical circuit including a controlled rectifier have anode, cathode and gate electrodes, the anode-cathode circuit of said rectifier being commonly connected in series with each of said relays and an intermediate tap on said transformer winding, the conductivity of said circuit selectively controlling the energization of said first and second relays,
    a first bridge circuit including said first thermistor,
    a second bridge circuit including said second thermistor,
    a transistor having a control electrode commonly connected to said bridge circuits and having an output electrode connected to said gate electrode, and responsive to the respective resistances of said first and second thermistors for applying pulsating D.C. to said gate electrode to cause conduction of said controlled rectifier in phase with the pulsating D.C. applied to said first relay when the resistance of said first thermistor reaches a first predetermined level, and for applying pulsating D.C. to said controlled rectifier to cause conduction thereof in phase with the pulsating D.C. applied to said second relay when the resistance of said second thermistor reaches a second predetermined level,
  whereby the contacts of said first relay are actuated to energize said cooling means when the temperature within said food compartment rises above a first preselected temperature level, and the contacts of said second relay are actuated to prevent energization of said cooling means and to energize said defrost means when the frost builds up on said cooling means to cool said second thermistor and depress the temperature thereof below a second preselected temperature level.

18. A control as set forth in claim 17 further including a first resistance interconnected in said first bridge circuit and means for modifying the magnitude of said resistance by actuation of a second set of first relay contacts thereby to increase the differential in the response of said first relay to changes in the resistance of said first thermistor, and a second resistance interconnected in first bridge circuit and means for modifying the magnitude thereof by actuation of a further set of second relay contacts thereby to increase the differential in the response of said second relay to changes in the resistance of said second thermistor.

19. A method of controlling the operation of refrigeration apparatus which includes cooling means adapted when energized to absorb heat from a refrigerated zone, at least a portion of said cooling means being subject to frost build-up, a first relay adapted to energize said cooling means, defrost means adapted when energized to defrost said cooling means, a second relay adapted to prevent energization of said cooling means and to energize said defrost means, and an electrical circuit interconnected with said first and second relays and through which said relays are selectively energized, said circuit including current switching means responsive to pulses applied thereto for controlling the conductivity of said circuit; said method comprising:
  applying out-of-phase pulses respectively to said first and second relays,
  sensing the temperature within said zone,
  applying pulses to said current switching means in phase with the pulses applied to said first relay to cause energization of said first relay by conduction of pulses through said circuit when the temperature within said zone has a predetermined relationship with respect to a preselected temperature level,
  sensing the actual frost build-up on said cooling means, applying pulses to said current switching means in phase with the pulses applied to said second relay when the actual frost build-up on said cooling means exceeds a preselected amount, to cause energization of said second relay by conduction of pulses through said circuit, whereby said first relay causes energization of said cooling means when the temperature within said zone rises above said preselected temperature level, and said second relay energizes said defrost means and prevents energization of said cooling means when the actual frost build-up on said cooling means exceeds said preselected amount.

References Cited by the Examiner

UNITED STATES PATENTS

| | | | |
|---|---|---|---|
| 2,669,848 | 2/1954 | Fujii | 62—140 X |
| 3,021,474 | 2/1962 | Byloff | 318—297 X |
| 3,040,157 | 6/1962 | Hukee | 219—20 |

OTHER REFERENCES

Publication, Electrical Design News, June 1959, "Magnet Amplifier Triggers Silicon Controlled Rectifiers."

ROBERT A. O'LEARY, *Primary Examiner.*